3,070,470
PROCESS FOR CURING SOLID COMPOSITE PROPELLANTS USING ELECTROMAGNETIC RADIATION
Perry A. Argabright, Nixon, and Irving Kuntz, Roselle Park, N.J., assignors to Esso Research and Engineering Company, a corporation of Delaware
Filed Jan. 29, 1958, Ser. No. 711,817
3 Claims. (Cl. 149—19)

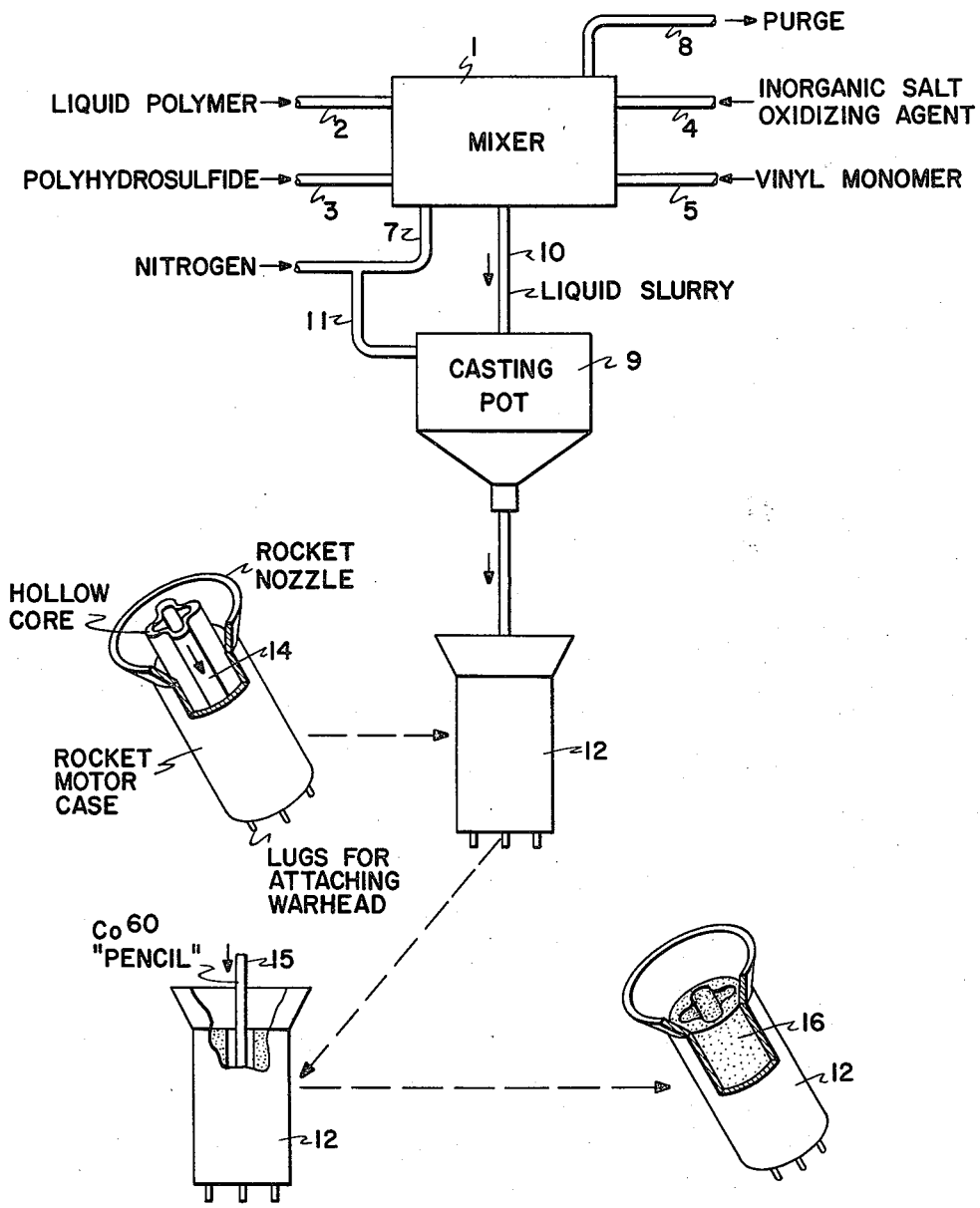

This invention is directed to the preparation of solid fuels which are particularly suited for solid propellant rockets. More particularly, this invention proposes a novel process using radiation, which readily yields excellent solid propellant fuel mixtures.

In brief compass, a uniform solid propellant rocket fuel is formed according to this invention by irradiating with gamma radiation a slurry of an unsaturated liquid polymer, an organic polyhydrosulfide, and a major proportion of a strongly oxidizing solid inorganic salt, to obtain a rubbery-like solid fuel.

While directed primarily to the preparation of rocket fuels containing an inorganic oxidizing agent, this invention is also useful in the preparation of materials containing large amounts of inorganic inactive salt fillers to yield compositions with good physical properties, e.g, tensile strength and elongation.

In one embodiment of this invention, in addition to the polymer, polyhydrosulfide and inorganic salt, an unsaturated monomer is used in the reaction mixture as a processing aid or to further improve the properties of the final product without adversely or unduly affecting the elasticity or rubbery character of the product.

The solid fuels of this invention have the proper tensile strength and excellent rubbery-like properties that admirably suit them for use in solid propellant rockets. The binder formed by cross-linking the unsaturated liquid resin with the organic polyhydrosulfide yields an excellent matrix that can contain the necessary very high loading of the inorganic oxidizer in the requisite uniformly dispersed manner. This matrix imparts to the fuel excellent and unusual physical properties such as strength, while serving as the combustible material and source of exhaust gases.

Besides being suitable for preparing solid propellant rocket fuels, this invention is useful in the preparation of rubbery materials containing large amounts of inorganic fillers. Such products, for example, find use as upholstery cushioning materials, building insulating materials, and shock absorbers.

Radiation is used to cure the slurry of ingredients. As compared to the use of chemical catalysts, such as peroxides, radiation has several important advantages. The use of a lower and thus safer temperature is permitted, and there is no catalyst residue in the product. A uniform curing, which is necessary to obtain a good fuel, is much more easily obtained by irradiation. Because of the presence of the inorganic oxidizing agent, an explosive mixture exists and it is obvious that it is undesirable to use a polymerization initiator such as a peroxide or azo compound to cure the mixture if a high temperature is required.

An unexpected advantage of this invention is that the liquid mixture when irradiated in the casing that is to contain the rocket fuel, strongly and very desirably bonds to the casing.

The following description, with reference to the drawing, attached to and forming a part of this specification, will serve to make this invention clear.

The drawing is a schematic flow plan of a method of forming a solid propellant rocket fuel according to this invention.

The liquid polymer used in this invention can be a polymer or copolymer of a monomeric diene, and has a viscosity in the range of 1 to 5000 poises at 100°F. to suit it for this use. It must be unsaturated to some extent. Resins having a bromine number in the range of 1.6 to 180 are satisfactory. Polymers having molecular weights in the range of 400 to 10,000 are preferred.

The formation of suitable liquid polymers is known to the art and forms no part of this invention. Preferably the monomeric diene has in the range of 4 to 20 carbon atoms. Suitable diene monomers that can be used to form the resins are isoprene, butadiene, piperylenes, cyclopentadiene, and the hexadienes.

If desired, copolymers of the above diene monomers with unsaturated monomers can be used. Usually, 10 to 80 mole percent of an unsaturated monomer can be used with 20 to 90 mole percent of the diene monomer. Preferably, the unsaturated monomer has 2 to 20 carbon atoms per molecule. Suitable unsaturated monomers are ethylene, propylene, butene-1, the pentenes, cyclopentene, styrene, vinyl toluene, methyl methacrylate, decyl acrylate, 2-ethylhexyl acrylate, and acrylonitrile. The use of vinyl aromatics having 8 to 20 carbon atoms per molecule, wherein the vinyl group is in resonance with the aromatic ring, is especially preferred in preparing the liquid copolymer.

The organic polyhydrosulfide used in this invention is one having 2 or more —SH groups. The polyhydrosulfide must be a liquid or be soluble in the liquid mixture. Preferably the polyhydrosulfide has a molecular weight in the range of 94 to 500. Examples are: ortho-, meta- or para-phenylene dithiols, the cyclohexanedithiols, 2,3-dimercaptopropanol-1, dithiomalonic acid, dithio terphthalic acid, and $\alpha,\alpha'$ dimercaptoxylene.

Preferably the polyhydrosulfide is an alkyl or aryl dimercaptan having in the range of 2 to 31 carbon atoms per molecule. Examples are: 1,2-ethanedithiol, 1,3-propanedithiol, hexamethylene dithiol, and tetramethylene dithiol. Especially preferred are alkyl dimercaptans having 2 to 10 carbon atoms per molecule.

Unsaturated monomers are useful as "diluents" in controlling the viscosity of the mixture or slurry before it is irradiated. Preferably the unsaturated monomer has 4 to 20 carbon atoms per molecule and can be, for example, a monoolefin, an unsaturated ester, or a vinyl aromatic. Examples of suitable compounds are: butyl acrylate, n-decyl acrylate, hexene-1, decene-1, styrene, 2-ethylhexyl acrylate, vinyl toluene, acrylonitrile, and vinyl-hexyl ether.

The inorganic oxidizing agent can be any one of the suitable inorganic salts known to the art in suitable particulate form. Examples are: ammonium nitrate, lithium perchlorate, ammonium perchlorate, potassium perchlorate, and potassium nitrate. Preferably the salt has a particle size in the range of approximately 0.1 to 500 microns.

As previously indicated, while this invention is primarily directed to the preparation of rubbery materials containing oxidizing inorganic salts, rubbery materials containing substantially inactive or no-oxidizing inorganic salts can also be prepared. Such rubbery materials, it has been found, have the desirable property of yielding to impact in such a manner as to make excellent shock absorbers. The recovery characteristics of the salt containing materials make their use for crash padding especially attractive. Thus, this product is admirably suited for use as an impact cushion on the dashboards of automobiles. When the relatively unreactive salts or fillers are used, they can be used in the proportion given for the oxidizing salts. Suitable unreactive fillers that can be used are: inorganic silicates, clays, diatomaceous earths, carbon black, potassium chloride, sodium chloride, sodium fluoride, and sodium sulfate.

The preferred proportions of ingredients in the slurry mixture before irradiation are 10 to 50, preferably 20 to 30, weight percent of the unsaturated liquid polymer, 0.1 to 1.0 weight percent of the organic polyhydrosulfide, and 50 to 90, preferably 70 to 80, weight percent of the inorganic salt. The unsaturated monomer diluent, if used, is present in an amount in the range of 10 to 50 weight percent of the organic material present in the mixture.

The initial slurry is prepared by admixing the ingredients in any order. A preferred method of preparation is to use a mixer such as a sigma blade mixer. Mixing may be carried out under vacuum or under an inert gas, such as nitrogen, if desired. The pumpable slurry can then be transferred to a casting pot, the pot then being positioned over a rocket motor case to permit the slurry to be cast. Again this can be done under inert gas pressure. Preferably the liquid slurry before curing has a viscosity in the range of 500 to 2000 poises at 100° F.

The radiation used to cure the mixture according to this invention is electromagnetic radiation having a wave length in the range of $10^{-3}$ to 10 A. which includes gamma and X-ray radiation. Preferably, a dose rate in the range of 0.05 to 5 megaroentgens per hour is used, although higher dose rates are operable. One of the unusual features of this invention is that excessive amounts of radiation are not required. Usually a total dose in the range of 0.1 to 20, preferably 1 to 5, megaroentgens is satisfactory, although higher amounts can be used.

The radiation can be obtained from any convenient source, such as from artifically produced radioisotopes, i.e., cobalt 60; from spent fuel elements or fission products from nuclear reactors; from shielded nuclear reactors or atomic piles and from X-ray machines.

The liquid mixture of ingredients is cured in a straightforward fashion by exposing it to the radiation, usually for a time in the range of 1 to 100 hours. Ambient temperature during irradiation is suitable, although higher or lower temperatures in the order of 0 to 200° F. can be used if more convenient for processing. The irradiation can be carried out while the liquid mixture is in a mold which is later removed, or directly in the rocket motor case. In the case bonding procedure, it has been found that the propellants of this invention bond very well to metals. Thus, the cured propellants can withstand temperature cycling without separation from the rocket wall. This feature eliminates the need for treatment or lining of the rocket motor.

The solid salt-containing polymer obtained by the irradiation has a tensile strength in the range of 50 to 500 p.s.i. and a percent elongation in the range of 10 to 200.

An attractive embodiment of this invention is illustrated in the attached drawing. This embodiment permits the preparation of very large solid propellant rockets, suitable for intermediate and intercontinental range missiles. A suitable liquid polymer, polyhydrosulfide, and oxidizing agent, e.g., the materials of Example 17 in the proportions indicated in the example, are admited to a mixer 1 by lines 2, 3 and 4 respectively. An inert atmosphere is maintained in the mixer by gas supplied by line 7, with gas being purged by line 8. An unsaturated monomer, e.g., styrene, can be admitted by line 5 if desired. After the slurry is formed, it is transferred to a casting pot 9 by line 10 and maintained under inert gas supplied by line 11. The slurry is then transferred from pot 9 to a rocket motor case or mold 12. As illustrated to the left, the mold comprises the ultimate rocket fuel case which is fitted with a nozzle and means for attaching a warhead, and a centrally disposed hollow core insert 14 of suitable shape. After the mold is filled with the slurry, it is transferred to suitable radiation facilities. In this example, the radiation source is a cobalt 60 "pencil" 15. Pencil 15 is inserted from an overhead shielded enclosure, not shown, into the center of core 14 for a sufficient period of time to permit enough radiation to be absorbed at room temperature by the slurry, to cure the polymer system. The pencil 15 and core 14 are then removed from the solid polymer to yield the final propellant 16. The propellant is firmly bonded to the rocket motor case and the whole assembly is ideally suited for its intended purpose.

EXAMPLES

The following radiation experiments were carried out by exposing the slurry mixtures to gamma irradiation obtained from an artifically produced cobalt 60 source in the form of a hollow 2-inch pipe having a rating of about 2300 curies.

Since facilities for handling explosive mixtures were not available, the irradiations were carried out using simple inorganic salts, such as sodium sulfate and sodium fluoride, as models for the oxidizing agent. Experiments have indicated that various ionic salts in this system behave similarly.

The liquid polymer used in these examples was a copolymer of 75 weight percent butadiene and 25 weight percent of styrene, marketed by the Enjay Company of New York, N.Y., under the name C-oil. It was obtained by the sodium catalyzed polymerization of the olefins in a hydrocarbon diluent.

The slurries were formed by simply admixing the ingredients in a laboratory mixer.

About 70 ccs. of each of these mixtures were poured into dumbbell shaped molds, similar to those used for tensile strength and elongation tests for paraffin waxes and asphalts. The dumbbell molds were then exposed to gamma radiation.

*Examples 1–4*

Mixtures of C-oil and 1,3-propanedithiol were prepared, in which the final mixture was 30 weight percent organic material and 70 percent inorganic salt as shown in the table. The experiments determined the effect of different amounts of 1,3-propane dithiol, the effect of different salts, and the effect of the amount of total radiation.

| Example | Dithiol, percent of organic material | Salt | Total Dose, Mega R. | Tensile Strength, p.s.i. | Percent Elongation |
|---|---|---|---|---|---|
| 1 | 1 | KCl | 20.6 | 40 | 140 |
| 2 | 2 | KCl | 20.6 | 65 | 70 |
| 3 | 2 | NaF | ~15 | 110 | 45 |
| 4 | 3 | NaF | ~15 | 170 | 30 |

The results indicate that increasing the amount of dithiol tends to increase the tensile strength of the casting. The very desirable tensile strengths and good elongation values of Examples 3 and 4 are to be noted. These examples indicate that excellent rubbery properties can be obtained in castings even with very large salt loadings.

*Examples 5–16*

The C-oil was blended with an unsaturated monomer as a diluent to obtain a slurry having a more convenient viscosity. The following examples show the excellent qualities of the castings obtained when the slurry contains various concentrations of an unsaturated monomer, n-decylacrylate. Examples 5–16 contained 2 percent by weight (on organics) of 1,3-propanedithiol. Sodium fluoride (70 percent by weight) was used as the model salt. These samples were subjected to a total dose ranging from 1.83 to 17.0 megaroentgens of gamma radiation.

| Example | Percent, Acrylate | Tensile Strength, p.s.i.g. | Percent, Elongation | Dose, Megaroentgens |
|---------|-------------------|---------------------------|---------------------|---------------------|
| 5       | 4.7               | 155                       | 30                  | ~15                 |
| 6       | 9.1               | 170                       | 30                  | ~15                 |
| 7       | 15.1              | 175                       | 25                  | ~15                 |
| 8       | 28                | 122                       | 35                  | 1.83                |
| 9       | 33                | 148                       | 26                  | 1.83                |
| 10      | 38                | 160                       | 24                  | 1.83                |
| 11      | 28                | 150                       | 30                  | 3.66                |
| 12      | 33                | 161                       | 24                  | 3.66                |
| 13      | 38                | 181                       | 31                  | 3.66                |
| 14      | 28                | 3.2                       | 19                  | 17.0                |
| 15      | 33                | 193                       | 21                  | 17.0                |
| 16      | 38                | 322                       | 25                  | 17.0                |

A radiation dose of 0.71 megaroentgen gave insufficient cures for mixtures containing 28, 33 and 38% n-decyl-acrylate. The minimum dose for this system containing a vinyl monomer diluent apparently falls between 0.71 and 1.83 megaroentgens. It is also of interest to note that the tensile strength increases with increasing total dose, whereas the percent elongation is only slightly affected.

*Example 17*

Because oxidizing agents are employed in solid propellant rocket formulations, it is important that the radiation used for curing propellants not affect or decompose the oxidizing agent. The following example shows that the oxidizing agent is not affected by radiation at the radiation levels contemplated for use in the present invention.

A mixture was prepared from ammonium nitrate (55 percent by weight), a solid oxidizing agent used in propellants, and a mixture of C-oil and 1,3-propanedithiol. The dithiol was present in the amount of 1.3% by weight on total organic material. The slurry was subjected to a total dose of gamma radiation of 3.6 megaroentgens, in a device which permitted the collection of any possible gaseous decomposition products. At the end of the experiment the sampling tube was cooled in liquid nitrogen and sealed. Examination of the contents of the tube by mass spectrometry showed that no decomposition products had been formed.

Having described this invention, what is sought to be protected by Letters Patent is succinctly set forth in the following claims.

What is claimed is:

1. A process for preparing solid propellant rocket fuels comprising forming a liquid slurry having a viscosity in the range of 500 to 2000 poises at 100° F. from in the range of 10 to 50 weight percent of an unsaturated liquid polymer chosen from the group consisting of a homopolymer of a diolefin having 4 to 20 carbon atoms and a copolymer of 20–90 mole percent of said diolefin and 10–80 mole percent of a vinyl aromatic hydrocarbon having 8 to 30 carbon atoms, in the range of 0.1 to 1.0 weight percent of an alkyl dimercaptan having 2 to 31 carbon atoms per molecule, and in the range of 50 to 90 weight percent of a strongly oxidizing solid inorganic salt, said unsaturated liquid polymer having a viscosity in the range of 0.1 to 5000 poises at 100° F., a bromine number in the range of 1.6 to 180, and a molecular weight in the range of 400 to 10,000, and said alkyl mercaptan being soluble in said slurry; and irradiating said slurry within the range of 0.1 to 20 megaroentgens of electromagnetic radiation having a wave length in the range of $10^{-3}$ to 10 A., said fuel having a tensile strength in the range of 50 to 500 p.s.i. and a percent elongation in the range of 10 to 200.

2. A process which comprises forming a mixture of a minor amount of an organic liquid polymer chosen from the group consisting of a homopolymer of a diolefin having 4 to 20 carbon atoms and a copolymer of 20–90 mole percent of said diolefin and 10–80 mole percent of a vinyl aromatic hydrocarbon having 8 to 30 carbon atoms having a bromine number in the range of 1.6 to 180 and a molecular weight in the range of 400 to 10,000, a minor amount of an alkyl dimercaptan having 2 to 31 carbon atoms per molecule and a major proportion of an inorganic salt; irradiating the mixture so obtained with electromagnetic radiation having a wave length in the range of $10^{-3}$ to 10 A. until it is converted into a rubbery solid having a tensile strength in the range of 50 to 500 p.s.i. and a percent elongation in the range of 10 to 200.

3. A process for forming a solid propellant rocket fuel comprising forming a liquid slurry of a minor amount of an unsaturated organic liquid polymer chosen from the group consisting of a homopolymer of a diolefin having 4 to 20 carbon atoms and a copolymer of 20–90 mole percent of said diolefin and 10–80 mole percent of a vinyl aromatic hydrocarbon having 8 to 30 carbon atoms, a small amount of an alkyl dimercaptan having 2 to 31 carbon atoms per molecule liquid at room temperature, and a major proportion of a strongly oxidizing inorganic salt; casting the slurry so obtained into a rocket motor case and curing the slurry in said case by electromagnetic radiation to obtain a solid propellant which is strongly bonded to said case and withstands temperature cycling.

References Cited in the file of this patent

UNITED STATES PATENTS

| | | |
|---|---|---|
| 2,402,977 | Patrick | July 2, 1946 |
| 2,479,470 | Carr | Aug. 16, 1949 |
| 2,877,504 | Fox | Mar. 17, 1959 |

FOREIGN PATENTS

| | | |
|---|---|---|
| 655,585 | Great Britain | July 25, 1951 |

OTHER REFERENCES

Ryan: "Nucleonics," vol. 11, pp. 13–15, August 1953.

Bopp et al.: USAEC Document ORNL 1373, pp. 1–24, 52–71, July 23, 1953.

The Van Nostrand Chemist's Dictionary, D. Van Nostrand., Inc., New York, New York (1953), pp. 573–574.

Ballantine: "Modern Plastics," November 1954, pp. 131, 132, 134, 136, 142, 228–230, 232.

Sun: Modern Plastics, September 1954, pp. 141–44, 146, 148, 150, 229–233, 236, 238.

Zaehringer: "Chem. Engineering Progress," vol. 51, p. 302, July 1955.

Siefert: "Jet Propulsion," vol. 25, p. 597, November 1955.

Arendale: "Ind. and Eng. Chem.," vol. 48, pp. 725, 726, April 1956.

Buchanan et al.: "Ind. and Eng. Chem.," vol. 48, pp. 730, 731.

Moore: "Jet Propulsion," vol. 26, p. 966, November 1956.

Atomics, vol. 7, No. 11, November 1956, pp. 397–8.

Smith: British Interplanetary Society Journal, vol. 16, No. 17, October-December 1957, p. 201.

Ritchey: Chem. and Eng. News, November 11, 1957, pp. 79–80.